United States Patent
Fuchs et al.

(10) Patent No.: US 12,196,445 B2
(45) Date of Patent: Jan. 14, 2025

(54) CHARGER HAVING A CHARGING ELECTRONICS UNIT AND A COOLING-AIR-GUIDING STRUCTURE

(71) Applicant: Andreas Stihl AG & Co. KG, Waiblingen (DE)

(72) Inventors: Michael Fuchs, Waiblingen (DE); Leonard Mattheis, Waiblingen (DE); Charis Hellmann, Korntal-Muenchingen (DE); Markus Mueller, Rudersberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 622 days.

(21) Appl. No.: 17/644,188

(22) Filed: Dec. 14, 2021

(65) Prior Publication Data
US 2022/0186974 A1 Jun. 16, 2022

(30) Foreign Application Priority Data
Dec. 15, 2020 (EP) .................................... 20214339

(51) Int. Cl.
*F24F 13/08* (2006.01)
*F24F 13/20* (2006.01)
*H02J 7/00* (2006.01)

(52) U.S. Cl.
CPC ............ *F24F 13/081* (2013.01); *F24F 13/20* (2013.01); *H02J 7/0013* (2013.01); *H02J 7/0045* (2013.01)

(58) Field of Classification Search
CPC .................................................. F24F 13/081
(Continued)

(56) References Cited

U.S. PATENT DOCUMENTS 9,728,822 B2 * 8/2017 Taga .................... H01M 10/613
2008/0290836 A1 11/2008 Tsai et al.
(Continued)

FOREIGN PATENT DOCUMENTS

| DE | 11 2016 002 974 T5 | 3/2018 |
| EP | 1 475 876 A1 | 11/2004 |
| EP | 3 327 888 A1 | 5/2018 |

OTHER PUBLICATIONS

German-language Third Party Observation issued in European Application No. 20214339.2 dated Jan. 3, 2024 with partial English translation (4 pages).
(Continued)

*Primary Examiner* — Yalkew Fantu
(74) *Attorney, Agent, or Firm* — Crowell & Moring LLP

(57) ABSTRACT

A charger includes a charger housing with at least one battery-charging space accessible from the outside for positioning of a rechargeable battery unit, a charging electronics unit in the charger housing for controlling an electrical charging operation for the battery unit positioned on the battery-charging space, and a cooling-air-guiding structure configured for guiding a cooling-air flow from an air inlet structure of the charger housing via the charging electronics unit to an air outlet structure of the charger housing. The cooling-air-guiding structure has a cooling housing arranged in the interior of the charger housing and has a cooling housing air inlet structure and a cooling housing air outlet structure, and is configured for guiding the cooling-air flow through the cooling housing from the cooling housing air inlet structure to the cooling housing air outlet structure and from the latter to the air outlet structure of the charger housing. The charging electronics unit has at least one electronic component which is arranged in the cooling housing. Use may be for electrically charging rechargeable
(Continued)

battery packs for electrically operated garden and forestry working apparatus.

14 Claims, 6 Drawing Sheets

(58) Field of Classification Search
USPC .......................................................... 320/113
See application file for complete search history.

(56) References Cited

U.S. PATENT DOCUMENTS

| | | | |
|---|---|---|---|
| 2018/0191183 A1* | 7/2018 | Namiki | H05K 7/20145 |
| 2018/0337540 A1 | 11/2018 | Taga | |
| 2019/0199101 A1* | 6/2019 | Hennesy | H02J 7/0031 |
| 2019/0372365 A1 | 12/2019 | Qin et al. | |
| 2020/0037474 A1* | 1/2020 | Silha | H02J 7/0013 |

OTHER PUBLICATIONS

German-language Extended European Search Report issued in European Application No. 20214339.2 dated Jun. 14, 2021 with partial translation (six (6) pages).

\* cited by examiner

CHARGER HAVING A CHARGING ELECTRONICS UNIT AND A COOLING-AIR-GUIDING STRUCTURE

CROSS REFERENCE TO RELATED APPLICATION

This application claims priority under 35 U.S.C. § 119 from European Patent Application No. 20214339.2, filed Dec. 15, 2020, the entire disclosure of which is herein expressly incorporated by reference.

BACKGROUND AND SUMMARY OF THE INVENTION

The invention relates to a charger comprising a charger housing having at least one battery-charging space which is accessible from the outside for the positioning of a rechargeable battery unit, a charging electronics unit in the charger housing for controlling an electrical charging operation for the battery unit positioned on the battery-charging space, and a cooling-air-guiding structure which is configured for guiding a cooling-air flow from an air inlet structure of the charger housing via the charging electronics unit to an air outlet structure of the charger housing.

Chargers of this type, more specifically electrical chargers, serve for charging, i.e. electrically recharging, a respective rechargeable electric battery unit which, for this purpose, is introduced into the battery-charging space or is arranged thereon. It can then be removed therefrom again on the operating side of the charger housing, in particular after recharging has taken place. The charger can be designed as a single-space charger which has a single battery-charging space, or as a multi-space charger which has a plurality of battery-charging spaces. The term battery unit here comprises an electrical energy storage of any conventional type of battery, in particular of the type of what are referred to as rechargeable battery packs, as are frequently used for the electrical energy supply, for example, of electrically operated garden and forestry working apparatus and electrically operated DIY (Do-It-Yourself) devices or hand-held tool devices.

The charging electronics unit controls the electrical charging operations for the battery units arranged on the battery-charging space or spaces and, for this purpose, is realized in a suitable conventional manner in each case, for example using control components, such as a microcontroller or the like, and charging-current-guiding components, for example using a power electronics part customary for this purpose. The charging electronics unit often includes one or more printed circuit boards on which the relevant components are located.

The cooling-air-guiding structure serves to conduct cooling air through the charger housing and to guide same in particular over the charging electronics unit in order to cool the charging electronics unit as a whole or one or more components thereof, depending on requirements. For this purpose, the cooling air passes via the air inlet structure into the charger housing and out of the charger housing again via the air outlet structure thereof. The air inlet structure and the air outlet structure of the charger housing can be of any suitable type, for example can be in the form of in each case one or more inlet or outlet slot regions arranged spaced apart from one another.

Laid-open publication US 2019/0199101 A1 discloses a charger of this type, in which two charging electronics units designed in the form of respective printed circuit boards are arranged in a mirrored arrangement next to each other in a cuboidal charger housing, and the cooling-air-guiding structure is configured for guiding two independent cooling-air flows over the respective charging electronics unit and, for this purpose, has, as air inlet structure, in each case two air inlet slot zones on adjacent sides of the charger housing and, as air outlet structure, in each case one air outlet slot zone which is formed on a further side, wherein in each case one fan is arranged adjacent to the respective air outlet slot zone on the inner side of the charger housing. The cooling-air-guiding structure is configured to guide the respective cooling-air flow primarily over a partial region of the associated printed circuit board in which heat-generating components are located, while a remaining printed circuit board region is scarcely reached by the cooling-air flow.

Laid-open publication EP 3 327 888 A1 discloses a charger of this type, in which the cooling-air-guiding structure is configured to first of all guide the cooling-air flow through a battery unit arranged on the battery-charging space, for which purpose said battery unit has its own air inlet structure, and subsequently to guide said cooling-air flow through the charger housing, for which purpose the air inlet structure of the charger housing is located in the region of the battery-charging space. A directed, tubular air duct in which a fan is arranged is formed in the charger housing, wherein the cooling-air flow flows to the charging electronics unit, which is realized in the form of a printed circuit board, in said flow duct.

Laid-open publication DE 11 2016 002 974 T5 discloses a further charger of the type mentioned at the beginning, in which a relatively high-powered fan or two fans is/are arranged in the charger housing in each case directly in front of one of two air outlet slot regions, forming the air outlet structure, on two adjacent charger housing sides, and the charging electronics unit in the form of a printed circuit board is arranged open in the charger housing in such a manner that the cooling-air flow provided by the cooling-air-guiding structure is guided over the printed circuit board, with the air inlet structure of the charger housing including an air inlet slot region located on a further housing side.

Also in the case of the charger of this type which is disclosed in laid-open publication US 2018/0337540 A1, the charging electronics unit is arranged open in the form of a printed circuit board in the charger housing, and the cooling-air-guiding structure guides the cooling-air flow over said printed circuit board from an air inlet slot region of the charger housing to an air outlet slot region which is formed on an opposite housing side and in front of which an associated fan is arranged. Furthermore, the cooling-air-guiding structure there is configured for additionally cooling a battery unit located on the battery-charging space by means of a further cooling air flow, for which a further air inlet slot region of the charger housing, a further fan and a further air outlet slot region of the charger housing are provided, wherein the further air outlet slot region opens out at the battery-charging space in order to conduct the corresponding cooling-air flow to the battery unit placed there.

It is the technical problem underlying the invention to provide a charger of the type mentioned at the beginning which can be realized with a comparatively low outlay and is improved in relation to the above-mentioned prior art, in particular in respect of its cooling functionality.

The invention solves this problem by providing a charger which comprises a charger housing having at least one battery-charging space which is accessible from the outside for the positioning of a rechargeable battery unit, a charging electronics unit in the charger housing for controlling an electrical charging operation for the battery unit positioned on the battery-charging space, and a cooling-air-guiding structure which is configured for guiding a cooling-air flow from an air inlet structure of the charger housing via the charging electronics unit to an air outlet structure of the charger housing, wherein the cooling-air-guiding structure includes a cooling housing which is arranged in the interior of the charger housing and has a cooling housing air inlet structure and a cooling housing air outlet structure and is configured for guiding the cooling-air flow through the cooling housing from the cooling housing air inlet structure to the cooling housing air outlet structure and from the latter to the air outlet structure of the charger housing. The charging electronics unit has at least one electronic component which is arranged in the cooling housing.

Advantageous developments of the invention which contribute to solving this and further problems are specified in the dependent claims, the content of which is hereby fully included in the content of the description by reference.

The air inlet structure and the air outlet structure of the cooling housing can be of any conventional type, for example can be in the form of in each case one or more inlet or outlet slot regions and/or inlet or outlet bores arranged in a localized manner and spaced apart from one another. The air inlet structure and the air outlet structure of the charger housing can be analogously of any suitable type, for example in the form of in each case one or more inlet or outlet slot regions and/or inlet or outlet bores arranged in a localized manner and spaced apart from one another, and/or in the form of consciously retained air leaks at one or more points of the charger housing, such as between mutually adjacent housing parts and/or in the region of the battery-charging space.

By means of the electronic component of the charging electronics unit being arranged according to the invention in the cooling housing inside the charger housing, the cooling housing protects the electronic component from external influences that may be present in the charger housing. For example, the electronic component can thus be additionally protected by the cooling housing against dirt entering the charger housing. Conversely, the cooling housing can protect the remaining interior space of the charger housing against undesirable influences due to the electronic component, for example against thermal influences due to heat output by the electronic component.

At the same time, the cooling housing as part of the cooling-air-guiding structure contributes to guiding the cooling-air flow, for which purpose it has the associated air inlet structure and the associated air outlet structure, and, furthermore, can act as a delimitation for the cooling-air flow through the cooling housing such that the electronic component which is arranged in the cooling housing can be subjected in a targeted manner to the influence of the cooling air flow and can thereby be cooled as required by the cooling-air flow. The presence of the cooling housing contributes to the cooling-air flow being able to be guided in a more directed and effective manner over and beyond the electronic component than in conventional arrangements, in which the charging electronics unit, for example in the form of a printed circuit board populated with the associated components, is placed open in the interior space of the charger housing.

In a development of the invention, the cooling housing air inlet structure and the cooling housing air outlet structure are each formed locally on two different side or corner regions of the cooling housing. This mutually coordinated placing of air inlet structure, on the one hand, and air outlet structure, on the other hand, in a localized manner in regions on two different sides or corners of the cooling housing makes it possible, in corresponding applications, for the cooling-air flow to be optimally guided through the cooling housing. The local air inlet structure and air outlet structure of the cooling housing can be in particular an inlet slot structure and outlet slot structure known per se. This local separation of air inlet structure and air outlet structure of the cooling housing also avoids cooling air emerging out of the cooling housing via the air outlet structure from immediately entering the cooling housing again via the air inlet structure, which could reduce the cooling effectiveness. For corresponding applications, it may alternatively be favorable to form the air inlet structure and the air outlet structure of the cooling housing on an identical side or in an identical corner region of the cooling housing.

In a development of the invention, the cooling housing is fireproof. In this case, the cooling housing has the additional function of protecting the rest of the charger housing from undesirable thermal influences which may arise in corresponding operating situations in the event of excessive heating of the electronic component arranged in the cooling housing. In particular, the cooling housing provides fire protection as is often desired or required for electronic components which may heat up excessively in unfavorable situations or in the event of malfunction and may give rise to the risk of surrounding material catching fire. With said fire protection by the cooling housing, it is no longer necessary to design the charger housing itself to be fireproof, i.e. even materials which do not meet certain fire protection properties can be used for the charger housing. In this case here, a fireproof design should be understood as meaning in particular that the relevant material has temperature resistance of up to at least approx. 850° C. without catching fire. Alternatively, the cooling housing is not fireproof, for example for applications in which the charger does not need to be fireproof or in which the charger housing itself is fireproof.

In a development of the invention, the charging electronics unit has at least one further electronic component which is located outside the cooling housing. This is a favorable division of the charging electronics unit for corresponding applications. At least one electronic component is accommodated in a protected manner in the cooling housing and is subjected to the cooling air flow through the cooling housing, and at least one other electronic component is placed outside the cooling housing, said last-mentioned electronic component being able to be in particular an electronic component which only produces a slight amount of heat, if any at all, during operation. Alternatively, all the electronic components of the charging electronics unit can be accommodated in the cooling housing.

In a development of the invention, the charging electronics unit has a power electronics part and/or a switchover electronics part, as can be expedient in particular if there is a plurality of battery-charging spaces for switching over recharging operations between the different battery-charging spaces, as an electronic component arranged in the cooling housing. With this measure, the power electronics part or the switchover electronics part can be effectively cooled by the cooling-air flow in the cooling housing, which is favorable in many cases because an electronics part that noticeably generates heat during operation is customarily involved here. Alternatively, the power electronics part or the switchover electronics part can be arranged outside the cooling housing if this is desired and sufficient in corresponding applications.

In a development of the invention, the cooling housing adjoins by means of its cooling housing air outlet structure to the air outlet structure of the charger housing. This couples the air outlet structure of the charger housing directly to the air outlet structure of the cooling housing, which is of advantage for many applications. This is because the cooling-air flow which is heated by the electronic component in the cooling housing is thereby conducted directly out of the charger housing without also flowing beforehand via another region in the charger housing and heating said region. Alternatively, the air outlet structure of the charger housing is arranged at a distance from the air outlet structure of the cooling housing if this affords advantages for corresponding applications, for example because an intermediate region of the charger housing is intended to be heated by the heated cooling-air flow.

In a development of the invention, the cooling housing air inlet structure includes two air inlet zones on two mutually adjacent side regions of the cooling housing. This is an optimized realization of the air inlet structure of the cooling housing for corresponding applications. It goes without saying that the case of two air inlet zones should be understood within the meaning of at least two air inlet zones, i.e., if required, three or more air inlet zones can also be provided on two, three or more different side regions of the cooling housing. The at least two air inlet zones which are separated locally from one another permit the entry of cooling air on the two corresponding side regions into the cooling-air housing, wherein the two air inlet zones can be formed, for example, by conventional air inlet slot regions. In alternative embodiments, depending on requirements and need, the cooling housing air inlet structure includes only a single air inlet zone on an associated side region of the cooling housing or two air inlet zones on an identical side or on opposite sides of the cooling housing.

In a development of the invention, the cooling housing has two opposite main sides and a narrow side circumference connecting them, and the cooling housing air inlet structure and the cooling housing air outlet structure are formed on the narrow side circumference. This realization proves optimum for many applications by the cooling air entering the cooling housing on the narrow side and also emerging out of the latter again on the narrow side, and therefore the cooling-air flow can flow effectively between the opposite main sides substantially parallel thereto, for example without a flow deflection by 90° or more with respect to the main side planes being required. In alternative embodiments, it can be of advantage to form the air inlet structure and/or the air outlet structure of the cooling housing on a respective main side of same.

In a development of the invention, the electronic component which is arranged in the cooling housing is specifically arranged on one of two opposite main sides of the cooling housing. This can contribute to optimizing the placing of the electronic component in the cooling housing and to the cooling thereof by the cooling-air flow. In particular, this refinement comprises the possibility, when the charging electronics unit is realized with a printed circuit board, of using said printed circuit board as one of the two main sides of the cooling housing such that an electronic component which is mounted on the printed circuit board is arranged on the relevant inner side of the cooling housing. In this case, the remaining part of the cooling housing forms as it were a housing hood which is connected to the printed circuit board and, for example, can be placed onto the printed circuit board and fixed thereto. Alternatively, the printed circuit board of the charging electronics unit can be arranged in the interior of the cooling housing without forming a housing wall of same, if this is of advantage for corresponding applications.

In a development of the invention, the cooling-air-guiding structure has a fan which is arranged adjacent upstream or downstream to the cooling housing air outlet structure. This positioning of the fan is optimum for many applications, both from flow aspects and also in respect of the outlay on installation and manufacturing and the construction form of the cooling housing and of the charger housing. The fan can be attached, for example, to the cooling housing itself or alternatively to the air outlet structure of the charger housing directly adjacent to the cooling housing air outlet structure. Alternatively, the fan can be arranged at a different location if this is favorable for corresponding applications, for example upstream or downstream adjacent to the cooling housing air inlet structure.

In a development of the invention, the air inlet structure of the charger housing is designed as a delocalized air inlet structure that has a plurality of air inlets which are distributed on at least one side region of the charger housing beyond the extent of the area thereof and/or are formed on at least two opposite side regions of the charger housing. A delocalized air inlet structure should be understood in the present case here as meaning that the air inlet structure does not exclusively consist of a single air inlet or a plurality of localized air inlets, for example in the form of corresponding conventional air inlet slot regions, but rather comprises a plurality of air inlets at various locations distributed widely over and throughout the charger housing. This can include even consciously retained air leaks in a housing wall or between two adjacent housing walls of the charger housing. This includes the possibility that corresponding air leak gaps are formed in the region of the battery-charging space or of the battery-charging spaces, for example in an entry region and/or an opposite battery contact region of a battery shaft region, which forms the battery-charging space, of the charger housing. The air inlet structure delocalized in such a way accordingly results in a locally distributed, diffuse air inlet characteristic for the charger housing, and therefore outside the cooling housing in the charger housing, the cooling air does not flow as a flow with a defined direction, but rather as a more diffuse, undirected flow. This has proven favorable for many applications. Alternatively, defined and directed guiding of the cooling air can also be provided outside the cooling housing in the charger housing if this is of advantage for corresponding applications.

In a refinement of the invention, at least one of the air inlets is located on a bottom side of the charger housing in a use position of the charger housing and forms a water outlet opening. This permits an advantageous dual use of the corresponding aperture in the charger housing both as an air inlet into the charger housing and as an outlet opening via which water which has penetrated the charger housing or is formed in the charger housing, for example due to condensation, can flow out of the charger housing when the charger housing is in the use position. The use position should be understood here as meaning the spatial positional orientation of the charger housing in which it is conventionally and correctly located when the charger is in operation. In alternative embodiments, the air inlets lack this additional function as openings for draining water in the use position of the charger housing.

Advantageous embodiments of the invention are illustrated in the drawings. These and further embodiments of the invention will be explained in more detail below.

DETAILED DESCRIPTION OF THE DRAWINGS

Figure 1:
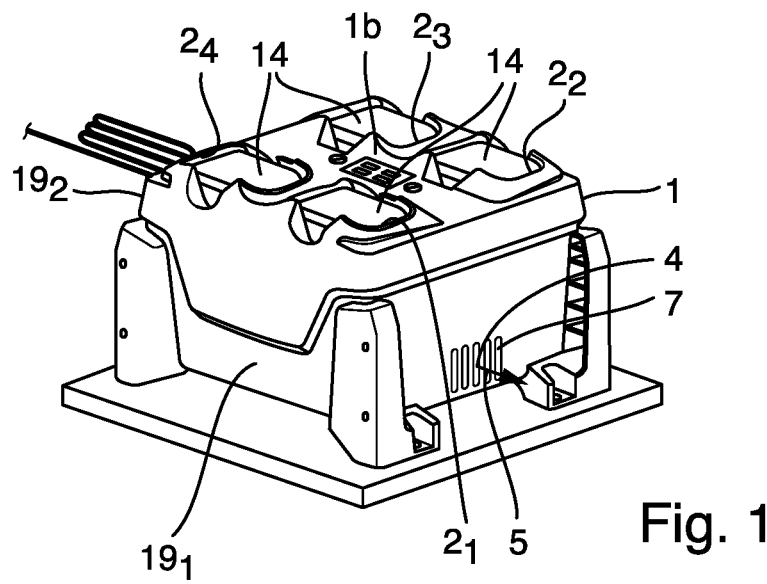
FIG. 1 shows a perspective view of a charger obliquely from above having a charger housing with a lower and an upper housing shell in a use position of the charger.

The charger according to the invention which is shown by way of example in a possible embodiment in the figures includes a charger housing 1 having at least one battery-charging space which is accessible from the outside for the positioning of a rechargeable battery unit, in the example shown four battery-charging spaces $2_1$, $2_2$, $2_3$, $2_4$, and a charging electronics unit 3 for controlling an electrical charging operation for the battery unit positioned at the respective battery-charging space $2_1$ to $2_4$. FIG. 1 shows the charger having four battery units 14 fitted into the four battery-charging spaces $2_1$ to $2_4$. A charging electronics unit 3 for controlling an electrical charging operation for the battery unit 14 positioned on the respective battery-charging space $2_1$ to $2_4$ is located in the charger housing 1.

Furthermore, the charger includes a cooling-air-guiding structure 4 which is configured for guiding a cooling-air flow 5 from an air inlet structure 6 of the charger housing 1 via the charging electronics unit 3 to an air outlet structure 7 of the charger housing 1. The cooling-air-guiding structure 4 includes a cooling housing 8 which is arranged in the interior of the charger housing 1 and has a cooling housing air inlet structure 9 and a cooling housing air outlet structure 10.

Figure 8:
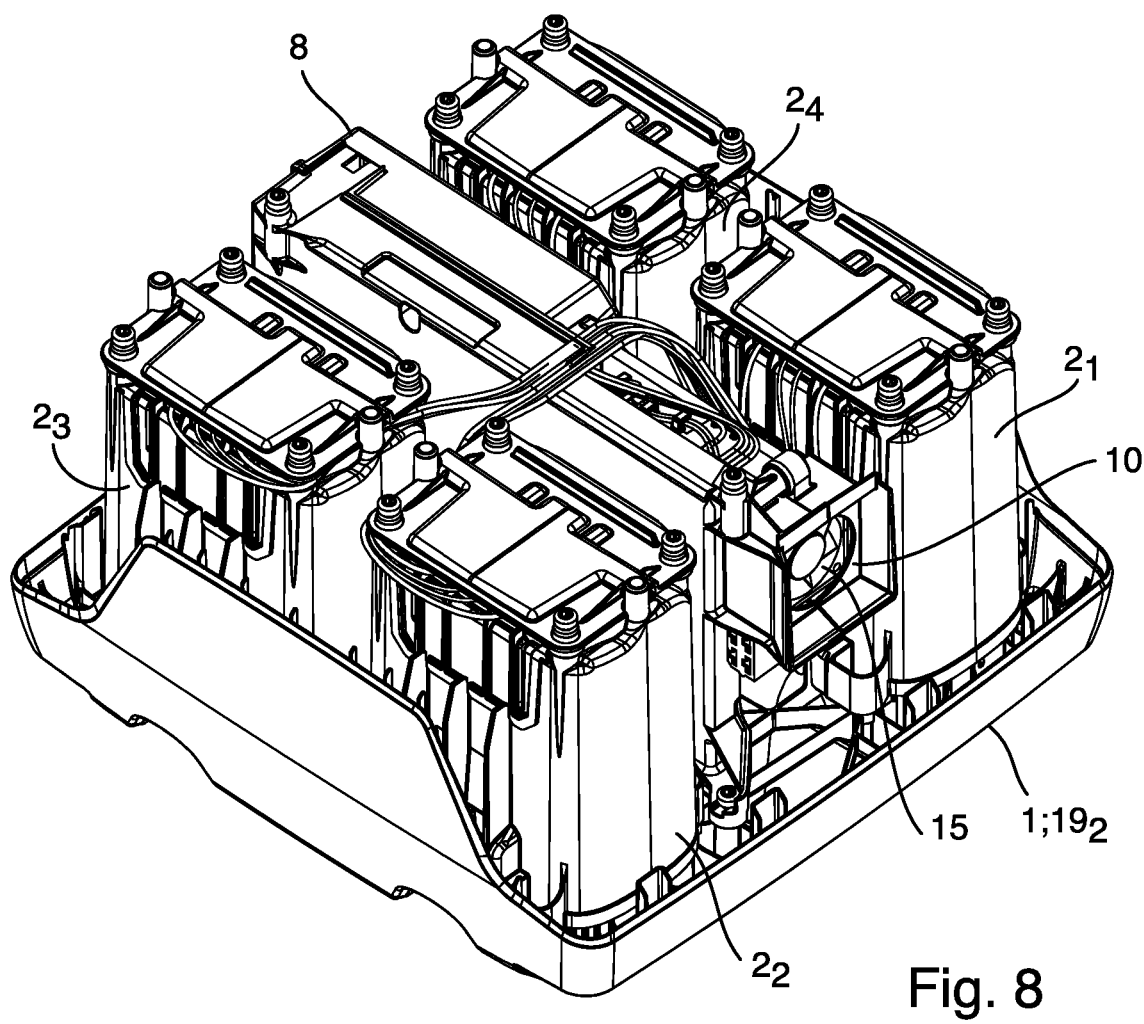
FIG. 8 shows a perspective view of the charger obliquely from below without the lower housing shell.

In the example shown, the charger housing is configured in cuboid form, i.e. with a square cross section, in particular is approximately cube-shaped. In alternative embodiments, the charger housing 1 has a different configuration, for example with a round or oval cross section or with a polygonal cross section with more than four corners. In the example shown, the four battery-charging spaces $2_1$ to $2_4$ are arranged in a square constellation, as is apparent, for example, from FIGS. 1 and 8. The cooling housing 8 is positioned approximately centrally in the charger housing 1 between in each case two of the four battery-charging spaces $2_1$ to $2_4$ and extends substantially over virtually the entire length and at least in sections over virtually the entire height of the charger housing 1, as is apparent in particular from FIGS. 8 and 9. Outer sides of the cooling housing 8 run approximately parallel here to outer sides of the charger housing 1.

The cooling-air-guiding structure 4 is configured for guiding the cooling-air flow 5 through the cooling housing 8 from the cooling housing air inlet structure 9 to the cooling housing air outlet structure 10 and from the latter to the air outlet structure 7. The charging electronics unit 3 has at least one electronic component $11_1$ which is arranged in the cooling housing 8, as illustrated schematically in FIG. 2.

In corresponding realizations, the cooling housing air inlet structure 9 and the cooling housing air outlet structure 10, as in the example shown, are each formed locally on two different side or corner regions of the cooling housing 8. In the example shown, the air inlet structure 9 of the cooling housing 8 is formed in the cooling housing 8 on a left upper side/corner region $8_3$ in FIGS. 2 and 3 and the air outlet structure 10 opposite on a right lower side/corner region $8_4$ in FIGS. 2 and 3. The cooling-air flow 5 can thereby flow optimally as it were longitudinally or diagonally through the entire cooling housing 8.

In advantageous embodiments, the cooling housing 8, as in the example shown, is fireproof, i.e. the material used for the cooling housing 8 is resistant to temperatures of at least 850° C. without catching fire. This avoids the charger catching fire if the electronic component $11_1$ accommodated in the cooling housing 8 heats up excessively, for example because of a defect or an overload situation.

Figure 2:
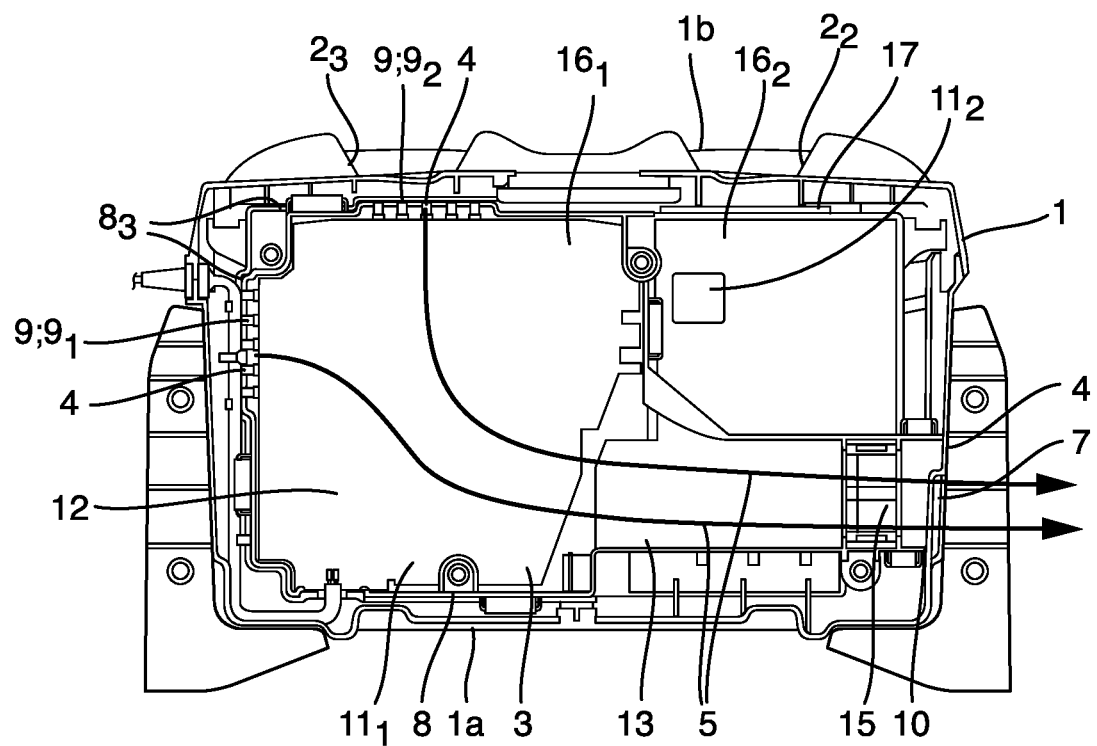
FIG. 2 shows a sectional view of the charger along a line II-II in FIG. 1.
Figure 3:
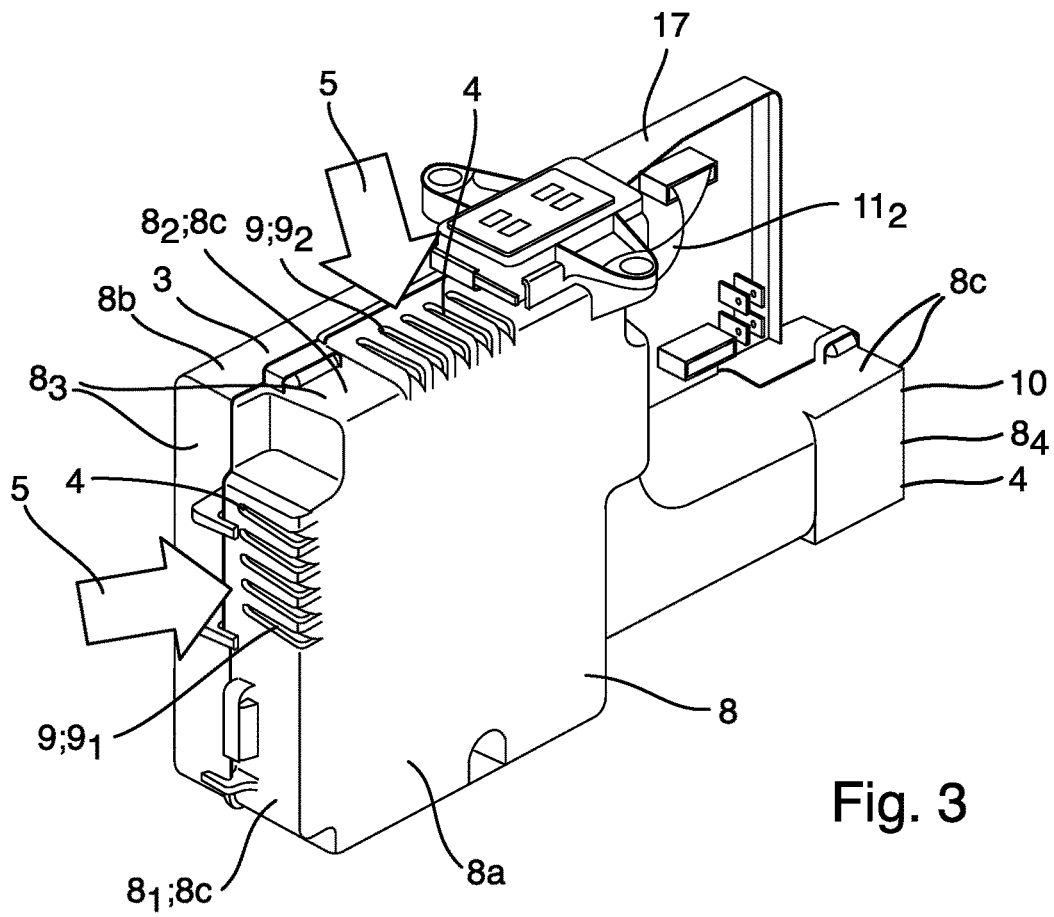
FIG. 3 shows a perspective view of a charging electronics unit which is accommodated in the charger housing and has a cooling housing.
Figure 4:
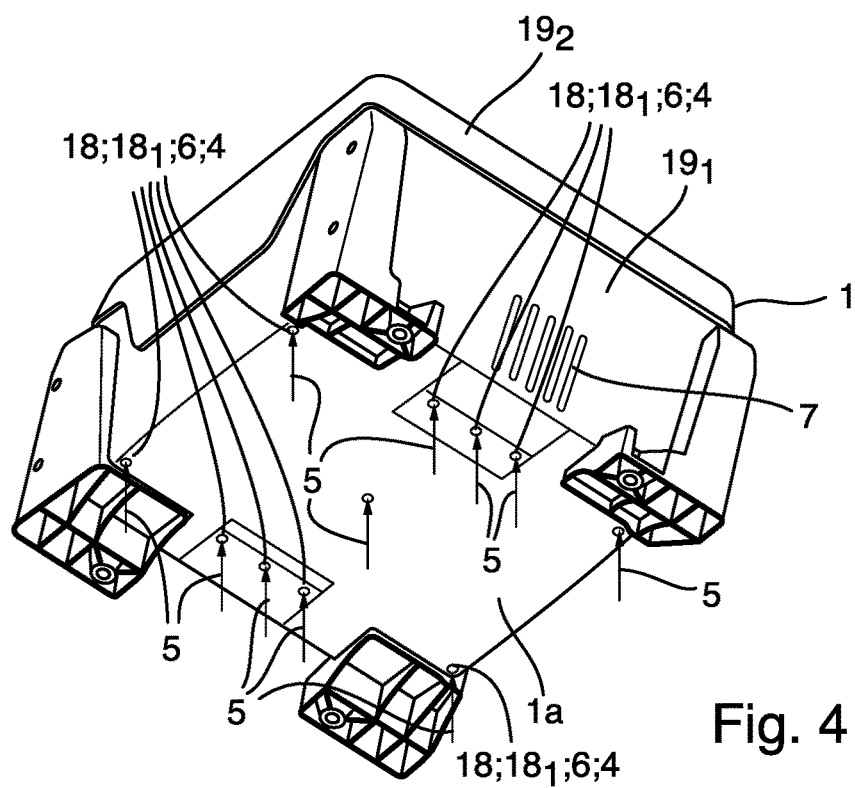
FIG. 4 shows a perspective view of the charger obliquely from below.
Figure 9:
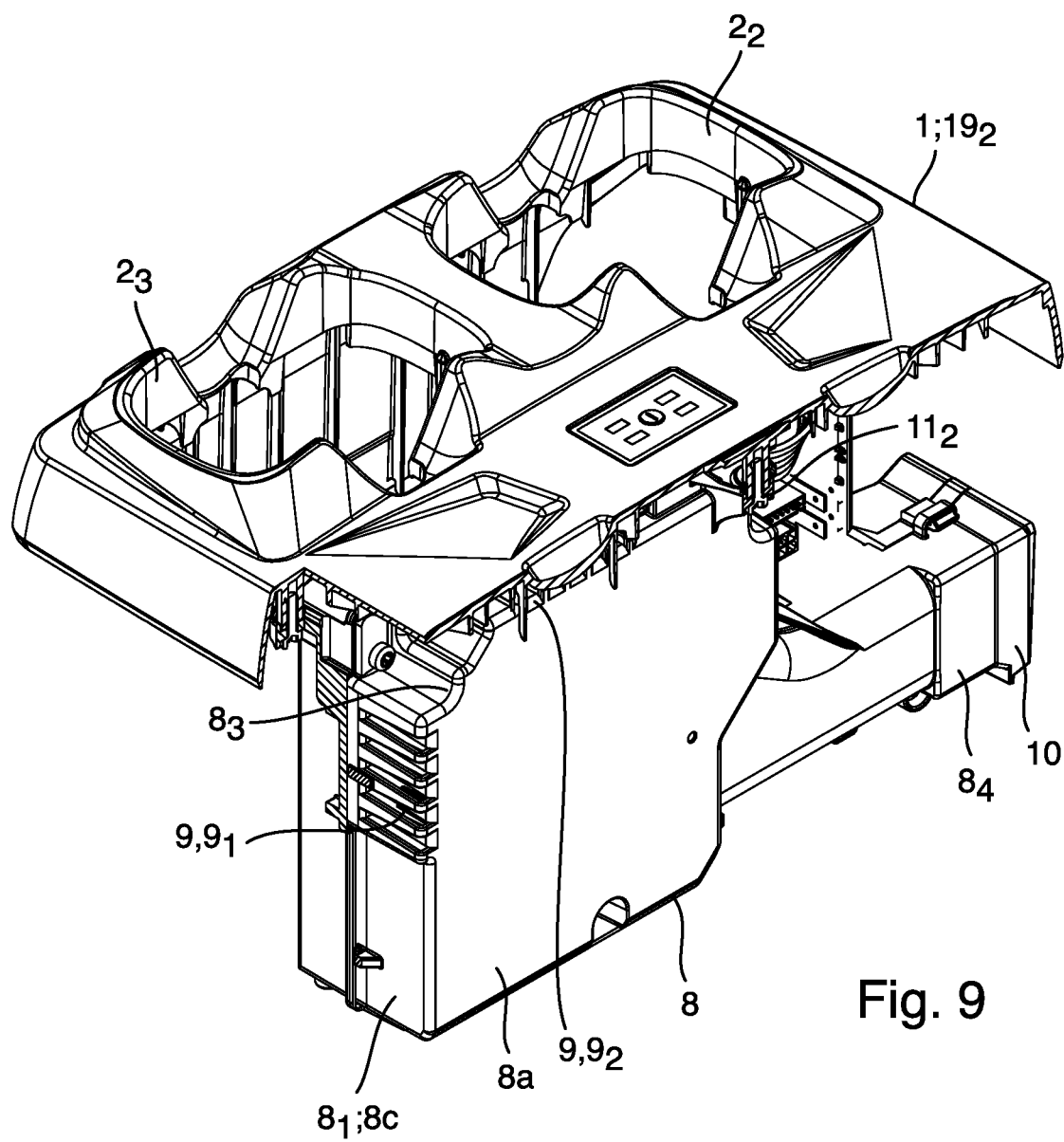
FIG. 9 shows a perspective view of the charger obliquely from above with the upper housing shell half cut away and without the lower housing shell.

In corresponding realizations, the charging electronics unit 3, as in the example shown, has at least one further electronic component $11_2$ which is located outside the cooling housing 8 and can be seen schematically, for example, in FIGS. 2, 3 and 9. Said electronic component $11_2$ outside the cooling housing 8 can be, for example, a microcontroller which only generates a small amount of heat during operation and therefore does not necessarily need to be cooled by the cooling-air flow 5. In alternative embodiments, the microcontroller is also located inside the cooling housing 8.

In corresponding embodiments, the charging electronics unit 3 comprises a power electronics part and/or a switchover electronics part as the at least one electronic component $11_1$ which is arranged in the cooling housing 8. In the example shown, both a power electronics part 12 and a switchover electronics part 13 each of conventional design are located in the cooling housing 8, as can be seen schematically in FIG. 2.

In advantageous embodiments, the cooling housing 8 adjoins by means of its cooling housing air outlet structure 10 to the air outlet structure 7 of the charger housing 1, as is also the case in the example shown and can be seen in particular from FIG. 2. In alternative embodiments, the air outlet structures 10, 7 of cooling housing 8 and charger housing 1 are arranged spaced apart from each other such that the cooling-air flow 5 after emerging from the cooling housing 8 first of all still flows in the charger housing 1 as far as its air outlet structure 7 before it leaves the charger housing 1.

In corresponding realizations, the cooling housing air inlet structure 9 includes at least two air inlet zones on two mutually adjacent side regions of the cooling housing 8. This permits an air entry, which is favorable in corresponding applications, into the cooling housing 8 on two adjacent housing sides. In the example shown, it includes one air inlet zone $9_1$, $9_2$ on each of two adjacent narrow side regions $8_1$, $8_2$ of the cooling housing 8. In alternative embodiments, the two adjacent side regions are different sides of the cooling housing 8.

In corresponding embodiments, the cooling housing 8, as in the example shown, has two opposite main sides $8a$, $8b$ and a narrow side circumference $8c$ connecting them, wherein the cooling housing air inlet structure 9 and the cooling housing air outlet structure 10 are formed on the narrow side circumference 8c, i.e. at suitable points of the circumference around the cooling housing 8 between the two opposite main sides 8a, 8b. As a result, the cooling-air flow 5, as is apparent from FIG. 2, can flow over its entire flow length in the cooling housing 8 substantially parallel to the main sides 8a, 8b without having to be deflected in a direction perpendicular to the main sides 8a, 8b. This is of advantage for the cooling efficiency of the cooling-air flow 5 in many applications. Alternatively, it can be provided, for example, that the air inlet structure 9 or the air outlet structure 10 of the cooling housing 8 is formed on one of its two main sides 8a, 8b.

In advantageous embodiments, the electronic component $11_1$ which is arranged in the cooling housing 8 is arranged on one of two opposite main sides of the cooling housing 8. Specifically, in the example shown, it is arranged on the rear main side 8b in FIG. 3. This is of advantage in particular if, as in the example shown, the charging electronics unit 3 has a printed circuit board constructional form, i.e. has one or more printed circuit boards $16_1$, $16_2$ which is or are populated with the diverse components of the charging electronics unit 3 since, in this case, the one or more printed circuit boards $16_1$, $16_2$ can simultaneously contribute in the form of a wall for the relevant main side of the cooling housing 8. In most cases, it is favorable in this connection if the one or more printed circuit boards $16_1$, $16_2$, as in the example shown, are mounted on a carrier plate 17 which closes off the cooling housing 8 on the relevant main side 8b completely or at any rate in an airtight manner to an extent such that the entry of air takes place primarily as desired via the air inlet structure 9 with the relevant air inlet zone or air inlet zones $9_1$, $9_2$ and is not disturbed by relatively large air leaks on this printed circuit board side of the cooling housing 8. The components of the charging electronics unit 3 that are mounted on the inner side on the printed circuit board or the printed circuit boards $16_1$, $16_2$ can then be effectively cooled by the cooling-air flow 5 if said components are located in the interior of the cooling housing 8. In this case, the remaining part of the cooling housing 8 forms a type of housing hood which is connected, preferably releasably, to the printed circuit board or the printed circuit boards $16_1$, $16_2$ and/or to the carrier plate 17 thereof.

In corresponding embodiments, the cooling-air-guiding structure 4, as in the example shown, has a fan 15 which is arranged upstream or downstream adjacent to the cooling housing air outlet structure 10. In the example shown, the fan 15 specifically sits in the air outlet region of the cooling housing 8, i.e. directly upstream of the cooling housing air outlet structure 10, as is apparent from FIGS. 2 and 8. In alternative embodiments, the fan can be positioned on the charger housing 1 in the region of the air outlet structure 7 thereof or in the air entry region of the cooling housing 8, i.e. upstream or downstream adjacent to the air inlet structure 9 thereof.

In corresponding realizations, the air inlet structure 6 of the charger housing 1 is designed, as in the example shown, as a delocalized air inlet structure and has a plurality of air inlets 18 which are distributed on at least one side region, in the example shown on a lower side 1a and on an upper side 1b, of the charger housing 1 over and throughout the extent of the area of this side region and/or are formed on at least two opposite side regions, in the example shown the lower side 1a and the upper side 1b, of the charger housing 1. By contrast, in the example shown, the air outlet structure 7 of the charger housing 1 is designed as a localized air outlet structure by being formed by a single air outlet slot structure with a plurality of closely adjacent parallel outlet slots.

In this embodiment, cooling air consequently enters the charger housing 1 in a correspondingly delocalized manner at the relatively large number of air entries 18 distributed over the charger housing 1, which results in a correspondingly undirected, diffuse cooling-air flow from the air inlet structure 6 of the charger housing 1 as far as the cooling housing air inlet structure 9, while the cooling air emerges out of the charger housing 1 as a directed cooling-air flow via the air outlet structure 7 with its localized air outlet slot structure. In alternative embodiments, the air inlet structure 6 of the charger housing 1, for example similarly as the air outlet structure 7 in the example shown, has a localized air inlet structure in the form of one or more spaced-apart air inlet zones or air inlet slot structures.

In addition, the air inlet structure 6 of the charger housing 1 can comprise air leaks which are consciously retained between mutually adjacent housing walls or housing parts of the charger housing 1. In the example shown, the charger housing 1 is composed of a lower housing shell $19_1$ and an upper housing shell $19_2$, and said two housing shells $19_1$, $19_2$ can be assembled with such air leaks being retained, for example with wall gaps or labyrinth seal regions being retained between the two housing shell walls.

In corresponding realizations, at least one of the air inlets, in the example shown these are a plurality of air inlets $18_1$, is located on a bottom side, in the example shown the bottom side 1a, of the charger housing 1 in a use position of the charger housing 1, wherein said respective air inlet $18_1$ at the same time forms a water outlet opening, i.e. water can flow out of the charger housing 1 via said air inlet $18_1$ if the charger housing 1 is in its use position shown, for example, in FIG. 1. For this additional function as a water outlet opening, the relevant air inlet $18_1$ is suitably configured, in particular by it being arranged on the bottom housing side 1a in the use position of the charger housing 1 at a water outlet point, which is preferably located as low down as possible, to which water which has penetrated the charger housing 1 or is formed therein can pass by means of corresponding water-conducting housing structures, in order to be able to be removed there.

Figure 5:
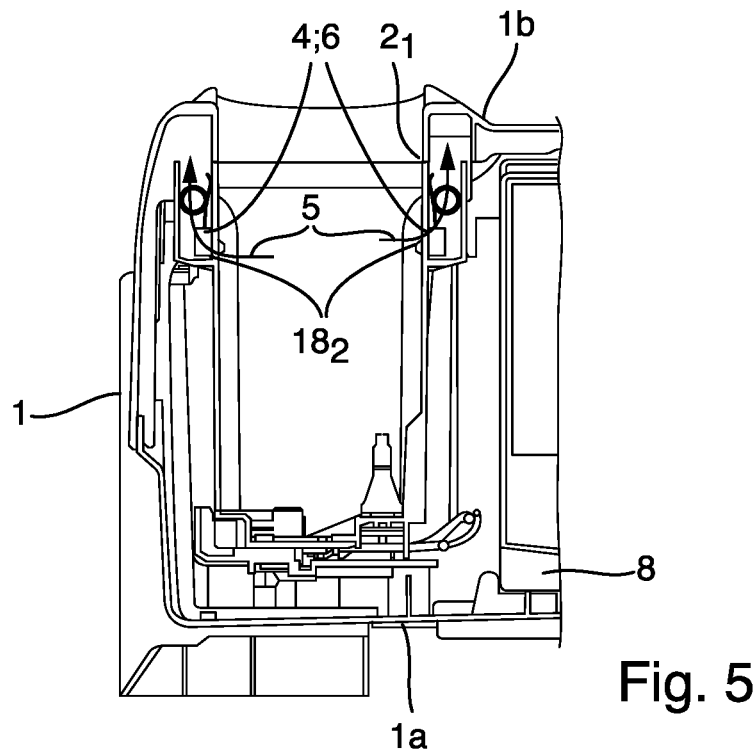
FIG. 5 shows a longitudinal sectional view of a battery-charging space of the charger housing.
Figure 6:
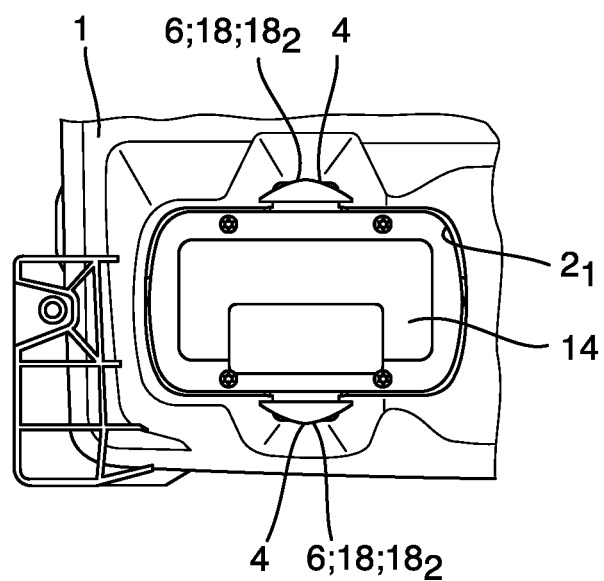
FIG. 6 shows a top view of the battery-charging space with an inserted battery unit.
Figure 7:
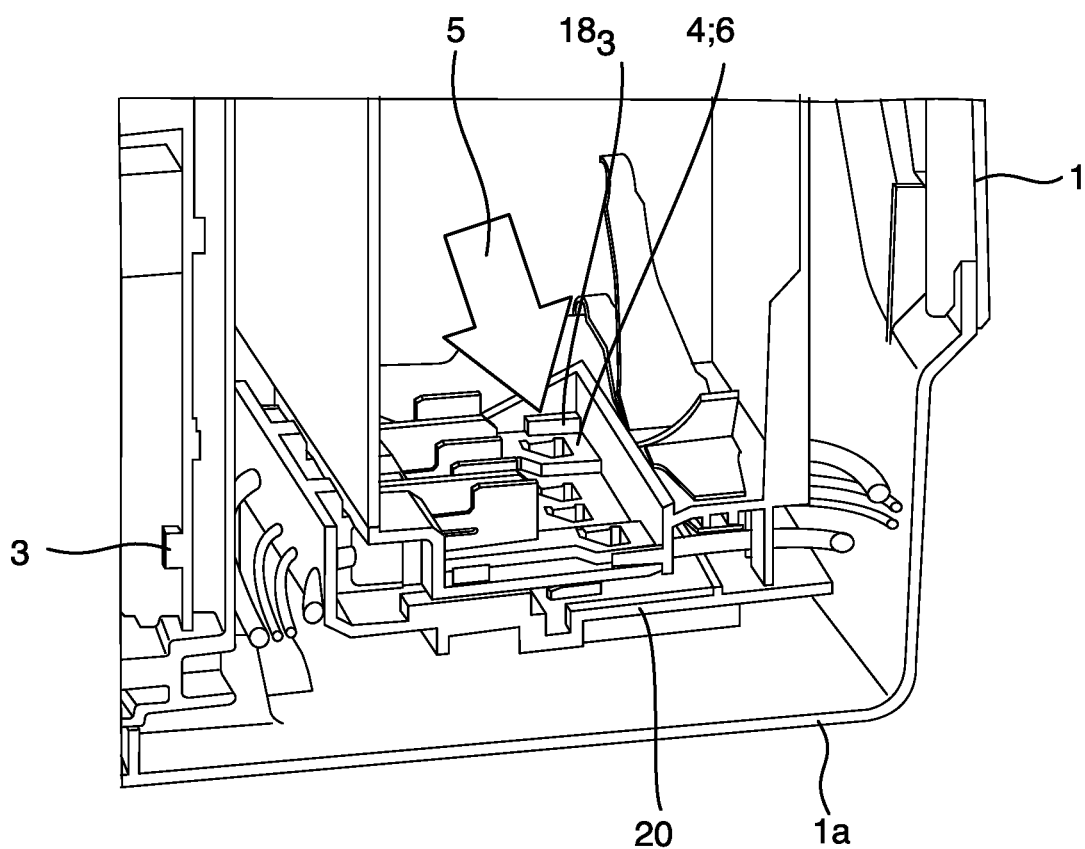
FIG. 7 shows a detailed sectional view of a lower region of a battery-charging space of the charger housing.

In the example shown, further air inlets $18_2$ are formed at gap regions in the entry region of the respective battery-charging space $2_1$ to $2_4$ on the upper side 1b of the charger housing 1, as is apparent from FIGS. 5 and 6, for example in the region of a locking lever mechanism for releasably locking the battery unit 14 inserted into the respective battery-charging space $2_1$ to $2_4$. In the example shown, the battery-charging spaces $2_1$ to $2_4$ are formed by corresponding battery chambers of the charging housing 1. Furthermore, in the example shown, air inlets $18_3$ are configured in the form of gap regions in contact plates 20 on the bottom side of the respective battery-charging space $2_1$ to $2_4$ or battery shaft, as can be seen specifically from FIG. 7.

As the exemplary embodiments which have been shown and the further exemplary embodiments explained above make clear, the invention provides a charger which advantageously has a cooling-air-guiding structure which makes it possible to accommodate one or more electronic components of a charging electronics unit in a dedicated cooling housing inside the charger housing and to effectively subject same there to a cooling-air flow. The charger which is optimized in terms of cooling in such a manner can be used, for example, for electrically charging battery units or rechargeable battery packs for garden and forestry working apparatus and for DIY devices or hand-held tool devices.

What is claimed is:

1. A charger, comprising:
a charger housing having at least one battery-charging space which is accessible from outside for positioning of a rechargeable battery unit;
a charging electronics unit in the charger housing for controlling an electrical charging operation for the battery unit positioned on the battery-charging space; and
a cooling-air-guiding structure which is configured for guiding a cooling-air flow from an air inlet structure of the charger housing via the charging electronics unit to an air outlet structure of the charger housing,
wherein
the cooling-air-guiding structure comprises a cooling housing which is arranged in the interior of the charger housing and has a cooling housing air inlet structure and a cooling housing air outlet structure and is configured for guiding the cooling-air flow through the cooling housing from the cooling housing air inlet structure to the cooling housing air outlet structure and from the latter to the air outlet structure of the charger housing, and
the charging electronics unit has at least one electronic component which is arranged in the cooling housing.

2. The charger according to claim 1, wherein the cooling housing air inlet structure and the cooling housing air outlet structure are each formed locally on two different side or corner regions of the cooling housing.

3. The charger according to claim 1, wherein the cooling housing is fireproof.

4. The charger according to claim 1, wherein the charging electronics unit comprises at least one further electronic component which is located outside the cooling housing.

5. The charger according to claim 1, wherein the charging electronics unit has a power electronics part and/or a switchover electronics part as the electronic component arranged in the cooling housing.

6. The charger according to claim 1, wherein the cooling housing adjoins with its cooling housing air outlet structure to the air outlet structure of the charger housing.

7. The charger according to claim 1, wherein the cooling housing air inlet structure comprises two air inlet zones on two mutually adjacent side regions of the cooling housing.

8. The charger according to claim 1, wherein the cooling housing has two opposite main sides and a narrow side circumference connecting them, and the cooling housing air inlet structure and the cooling housing air outlet structure are formed on the narrow side circumference.

9. The charger according to claim 1, wherein the electronic component which is arranged in the cooling housing is arranged on one of two opposite main sides of the cooling housing.

10. The charger according to claim 1, wherein the cooling-air-guiding structure comprises a fan which is arranged adjacent upstream or downstream to the cooling housing air outlet structure.

11. The charger according to claim 1, wherein the air inlet structure of the charger housing is designed as a delocalized air inlet structure and comprises a plurality of air inlets which are distributed on at least one side region of the charger housing throughout the extent of the area thereof.

12. The charger according to claim 1, wherein the air inlet structure of the charger housing is designed as a delocalized air inlet structure and comprises a plurality of air inlets which are formed on at least two opposite side regions of the charger housing.

13. The charger according to claim 11, wherein at least one of the air inlets is located on a bottom side of the charger housing in a use position of the charger housing and forms a water outlet opening.

14. The charger according to claim 12, wherein at least one of the air inlets is located on a bottom side of the charger housing in a use position of the charger housing and forms a water outlet opening.

* * * * *